United States Patent Office 3,558,183
Patented Jan. 26, 1971

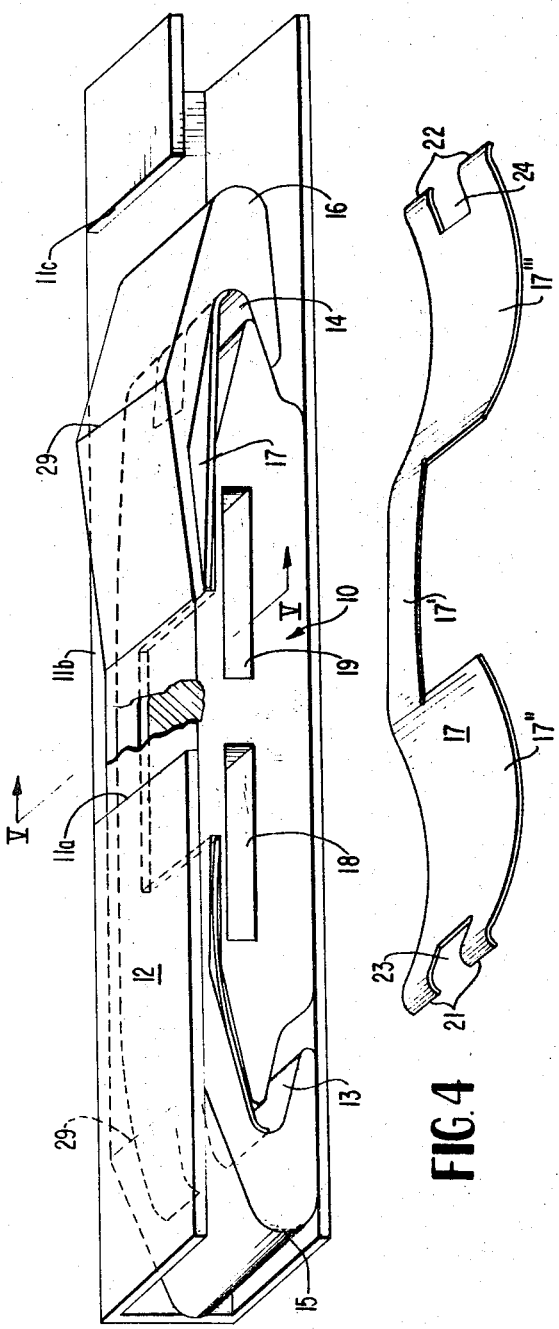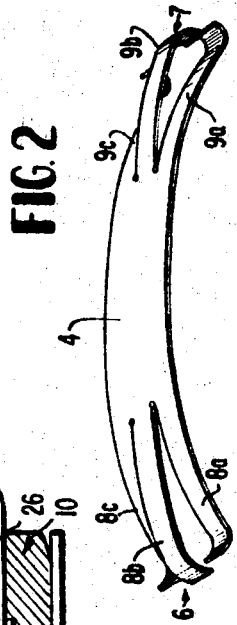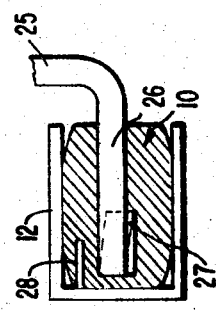
INVENTOR
GERHARD SIGMUND
ATTORNEYS

3,558,183
SLIDE SHOE STRUCTURES OF SYNTHETIC PLASTIC MATERIAL FOR SLIDING ROOFS OF MOTOR VEHICLES
Gerhard Sigmund, Stuttgart-Vaihingen, Germany, assignor to Daimler-Benz Aktiengesellschaft, Stuttgart-Unterturkheim, Germany
Filed July 31, 1968, Ser. No. 748,990
Claims priority, application Germany, Aug. 3, 1967,
1,630,330
Int. Cl. B60j 7/02
U.S. Cl. 296—137         13 Claims

ABSTRACT OF THE DISCLOSURE

A slide structure made from synthetic plastic material for sliding roofs of motor vehicles, which slides in profile members and is provided with an aperture or recess within which is arranged at least one prestressed spring.

---

The present invention relates to slide shoe structures of synthetic plastic material for motor vehicle sliding roofs whose slide members slide within profiles or sectional members and springily or elastically abut at the profile leg portions.

Slide shoes of synthetic plastic material became already known in the German Auslegeschrift 1,111,962 which are so constructed that by reason of their elasticity they abut springily at the guide tracks and thus are intended to prevent a rattling of the sliding roof. This freedom from rattling, however, can be lost in that the synthetic plastic material ages or is exposed to a high wear or high temperatures.

Accordingly, the present invention is concerned with the task to assure an absolute freedom from rattling in all positions of the sliding roof also under difficult operating conditions.

The underlying problems are solved in that the slide members are each provided according to the present invention with a recess, groove or cut, in which is arranged at least one prestressed spring.

As easy movability of the sliding roof is achieved if the slide members are constructed pontoon-shaped as viewed from the side and have a crowned or spherical cross section.

With the slide members displaceable in U-shaped guide rails, one obtains a good seal of the sliding roof in the closed condition if slide members with two different lengths are inserted whereby these lengths are so matched that one slide member, during closing of the sliding roof, leaves an aperture accommodated in the guide rail and pointing to the vehicle top side whereas the other slide member passes by this aperture.

According to a preferred construction of the present invention, the slide members suitable for leaving the aperture have each one roof-carrier receiving means and the other slide members have each two roof-carrier receiving means, which extend through the slide members in the transverse direction either completely or partly in the form of an elongated downwardly offset groove. During the assembly, the roof carrier engages in the offset of the groove by means of a claw-like projection bent off from its base portion.

An assist of the elasticity of the slide member is achieved if one type of slide shoe is provided above the roof-carrier receiving means with an approximately oval recess or aperture extending in the vehicle longitudinal direction over its entire width which accommodates a prestressed leaf spring matched to the shape of the aperture or recess; the leaf spring is provided starting from the two smaller sides, with two cuts extending up to about ⅓ of the length of the spring and similar in their division so that three tongue portions each result, of which two are bent off in the same direction whereas the third tongue portion projects over the two other tongue portions and is bent in the opposite direction.

The other type of slide member is advantageously so constructed that it includes two cuts or recesses extending predominantly in the vehicle longitudinal direction and matched to the external shape of the slide member, which are connected by a further cut or recess extending up to about ⅓ of the width of the slide member, into which is inserted the center web portion of a leaf spring bent off on both sides of the center web portion in an undulated shape; the leaft spring is provided along each narrow side with an aperture so that the two slide shoes which are formed by the cuts or recesses, abut elastically against the upper profile guide rail and engage with downwardly projecting, internal nose portions into the respective aperture.

Accordingly, it is an object of the present invention to provide slide members for sliding roofs of motor vehicles which avoid by simple means the aforementioned shortcomings and drawbacks encountered in the prior art.

Another object of the present invention resides in slide shoes for sliding roofs of motor vehicles adapted to slide in profile members which permit the use of synthetic resinous materials without the danger of rattles as a result of wear, aging or exposure to high temperatures.

A further object of the present invention resides in slide means made of synthetic plastic material for sliding roofs of motor vehicles which assure by extremely simple means a noise and rattle-free operation under all operating conditions.

A still further object of the present invention resides in slide members of the type described above which not only enable ease of handling but assure a good seal of the sliding roof.

These and further objects, features, and advantages of the present invention will become more obvious from the following description when taken in connection with the accompanying drawing which shows for purpose of illustration only, one embodiment in accordance with the present invention, and wherein:

FIG. 1 is a perspective side view of one type of a slide member in accordance with the present invention which is suited for leaving an aperture or cutout;

FIG. 2 is a perspective view of the spring used with the slide member of FIG. 1;

FIG. 3 is a perspective side view of a modified type of slide member in accordance with the present invention which is operable to pass by an aperture or cutout in the guide rail;

FIG. 4 is a perspective view of the spring used with the slide member of FIG. 3; and FIG. 5 is a cross-sectional view taken along line V—V of FIG. 3.

Referring now to the drawing wherein like reference numerals are used throughout the various views to designate like parts, and more particularly to FIG. 1, the slide member illustrated in this figure and generally designated by reference numeral 1, which is made of any synthetic resinous material of known type, slides within a profile or sectional member constituted by a U-shaped rail 2. The approximately oval aperture or cutout 3 of the slide member 1 accommodates the leaf spring 4 (FIGS. 1 and 2) whereas the rectangular groove 5, which is provided for the insertion of a roof carrier of any conventional construction, thus forms a roof carrier-receiving means.

As can be seen more clearly from FIG. 2, the arcuately shaped leaf spring 4 is provided with two longitudinally extending cuts at each end which start from the two narrow sides generally designated by reference numerals 6 and 7 of the leaf spring 4, whence three tongue portions 8a, 8b, 8c and 9a, 9b, 9c are formed, respectively. The ends of the tongue portions 8a, 8c and 9a, 9c are bent upwardly whereas the tongue portions 8b and 9b disposed therebetween project over the adjacent tongue portions and are bent downwardly.

FIG. 3 illustrates a slide member generally designated by reference numeral 10, made again of conventional synthetic resinous material, which slides past the aperture or cutout in the U-shaped rail 12 constituted by the three sides 11a, 11b and 11c because the distance of the two upwardly projecting edges 29 is larger than the length of the side 11b of the aperture. Two slide shoes 15 and 16, properly speaking, result from the two cuts or recesses 13 and 14, which are matched approximately to the external contour of the slide member 10. The slide shoe portions 15 and 16 are pressed against the upper guide track of the U-shaped rail 12 by the inserted leaf spring 17. The slide shoe structure 10 is provided with two roof-carrier-receiving means in the form of two rectangular grooves 18 and 19 for receiving conventional roof carriers.

The leaf spring 17 according to FIG. 4 consists of the center web portion 17' and of the two end portions 17'' and 17''' of undulated shape and extending from the center web portion 17' in opposite directions. Two apertures 23 and 24 are provided at the narrow sides 21 and 22 of the end portions 17'' and 17''' into which engage respective nose portions (not shown) of any suitable construction during the insertion of the leaf spring 17 into the slide shoe 10; these nose portions (not shown) project downwardly from the inner side of the slide shoe portions 15 and 16 whereby a lateral displacement of the leaf spring 17 is prevented.

The cross section according to FIG. 5 illustrates an inserted roof carrier 25 which is supported in the offset part of the groove by means of the claw-like portion 27 bent off from the base portion 26 thereof. The spherically or crown-shaped slide member 10 slides in the U-shaped rail 12 and is provided with a cut or groove 28 extending approximately up to ⅓ the width of the slide member; the center web portion 17' of the leaf spring 17 is inserted into the cut or groove 28 during the assembly thereof.

The otherwise conventional sliding roof of the motor vehicle (not shown) may be constructed thereby in such a manner that it includes at least one slide shoe 1 and one slide shoe 10 slidingly carrying the sliding roof in the U-shaped guide rails by way of roof carriers inserted into the grooves 5 and 18, 19 in such a manner that during closing of the roof, the slide shoe 1 leaves the cutout 11a, 11b and 11c whereas the other slide shoe 10 slides past the cutout 11a, 11b and 11c The guide rails 12 are installed on the lateral edges of a rectangular opening in the car roof and at an angle thereto. The cutout 11a, 11b and 11c is provided on the upper leg of the guide rail 12 in the zone of the rear edge of the rectangular opening. Thus, the rear short sliding shoe 1 at the rear portion of the sliding roof can exit from the guide rail 12 when the sliding roof is being closed and, on the other hand, can return into the slide track during the opening of the roof. This can be readily achieved in a conventional manner by appropriately selecting the dimensions of the cutout 11a, 11b 11c in relation to the dimensions of the slide shoes 1 and 10 and their respective mutual location and spacing.

While I have shown and described only one embodiment in accordance with the present invention, it is understood that the same is not limited thereto but is susceptible of numerous changes and modifications as known to a person skilled in the art, and I therefore do not wish to be limited to the details shown and described herein.

I claim:

1. A slide shoe structure for sliding roofs of motor vehicles having a plurality of slide shoe means which are made of synthetic resinous material, and profile means within which said slide shoe means slides, said slide shoe means being provided with aperture means, at least one prestressed spring means arranged in said aperture means, each slide shoe means being provided with at least one slide shoe portion operable to abut elastically against the profile means as a result of the elasticity caused by said aperture means, said profile means including a substantially U-shaped guide rail having a cutout pointing in the direction toward the top of a vehicle, said slide shoe means being of pontoon-like shape as viewed from the side and having a crowned cross section, wherein two of said slide shoes means are of different lengths which are so dimensioned that one slide shoe means, during closing of the sliding roof, leaves said cutout whereas the other slide shoe means slides past the cutout.

2. A slide shoe structure according to claim 1, wherein the slide shoe means operable to leave the cutout is provided with one roof carrier-receiving means while the other slide shoe means is provided with two roof carrier-receiving means, said roof carrier-receiving means extending substantially in the vehicle transverse direction and being adapted to receive roof carrier means.

3. A slide shoe structure according to claim 2, wherein the roof carrier-receiving means extend transversely at least partly through the slide shoe means in the form of elongated, downwardly offset groove means, and wherein the roof carrier means engage in the offset part of a respective groove means by means of a claw-like portion provided at the foot thereof.

4. A slide shoe structure according to claim 3, wherein the roof carrier-receiving means extend completely through respective slide shoe means in the transverse direction in the form of elongated, downwardly offset groove means.

5. A slide shoe structure according to claim 3, wherein one slide shoe means is provided with an approximately oval aperture means extending above the roof-carrier-receiving means in the vehicle longitudinal direction over the entire width thereof, said aperture means accommodating the spring means in the form of a prestressed leaf spring means approximately matched in its shape to the configuration of the aperture means, said leaf spring means being provided with two cuts starting from a respective narrow side thereof up to at most about ⅓ of the spring length to provide three tongue portions, of which two tongue portions are bent off in the same direction while the third tongue portion projects over the other two tongue portions and is bent off in the opposite direction.

6. A slide shoe structure according to claim 5, wherein said cuts spaced to substantially similarly divide said tongue portions in the transverse direction, and the two tongue portions accommodate therebetween the third tongue portion.

7. A slide shoe structure according to claim 6, wherein one silde shoe means is provided with two aperture means extending predominantly in the vehicle longitudinal direction and approximately matched to the outer configuration of the slide shoe means, said aperture means being connected by a further aperture extending up to about ⅓ of the width of the slide shoe means, said spring means including a center web portion and end portions of undulated shape extending from said center web portion in opposite directions, said center web portion being inserted into said further aperture, each end portion being provided with a cutout, and the slide shoe portions of the slide shoe means, which are constituted by said two aperture means, being each provided with a nose portion engaging into a respective cutout in the end portion of the spring means so that the slide shoe portions abut elastically against an upper guide rail of the profile means.

8. A slide shoe structure according to claim 7, wherein said nose portions project downwardly from the inside of said slide shoe portions into the aperture means.

9. A slide shoe structure for sliding roofs of motor vehicles having a plurality of slide shoe means which are made of synthetic resinous material, and profile means within which said slide shoe means slides, said slide shoe means being provided with aperture means, at least one prestressed spring means arranged in said aperture means, and said profile means including a substantially U-shaped guide rail having a cutout pointing in the direction toward the top of a vehicle, wherein two of said slide shoe means are of different lengths which are so dimensioned that one slide shoe means, during closing of the sliding roof, leave said cutout whereas the other slide shoe means slides past the cutout.

10. A slide shoe structure according to claim 9, wherein the slide shoe means operable to leave the cutout is provided with one roof-carrier-receiving means while the other slide shoe means is provided with two roof-carrier-receiving means, said roof-carrier-receiving means extending substantially in the vehicle transverse direction and being adapted to receive roof carrier means.

11. A slide shoe structure according to claim 10, wherein the roof-carrier-receiving means extend transversely at least partly through the slide shoe means in the form of elongated, downwardly offset groove means, and wherein the roof carrier means engage in the offset part of a respective groove means by means of a claw-like portion provided at the foot thereof.

12. A slide shoe structure according to claim 9, wherein one slide shoe means is provided with an approximately oval aperture means extending in the vehicle longitudinal direction over the entire width thereof, said aperture means accommodating the spring means in the form of a prestressed leaf spring means approximately matched in its shape to the configuration of the aperture means, said leaf spring means being provided with cuts starting from a respective narrow side thereof up to at most about ⅓ of the spring length to provide three tongue portions, of which two tongue portions are bent off in the same direction while the third tongue portion projects over the other two tongue portions and is bent off in the opposite direction.

13. A slide shoe structure according to claim 12, wherein one slide shoe means is provided with two aperture means extending predominantly in the vehicle longitudinal direction and approximately matched to the outer configuration of the slide shoe means, said aperture means being connected by a further aperture extending up to about ⅓ of the width of the slide shoe means, said spring means including a center web portion and end portions of undulated shape extending from said center web portion in opposite directions, said center web portion being inserted into said further aperture, each end portion being provided with a cutout, and the slide shoe portions of the slide shoe means, which are constituted by said two aperture means, being each provided with a nose portion engaging into a respective cutout in the end portion of the spring means so that the slide shoe portions abut elastically against an upper guide rail of the profile means.

References Cited

UNITED STATES PATENTS

| | | | |
|---|---|---|---|
| 1,985,298 | 12/1934 | Prince | 16—93 |
| 2,015,270 | 9/1935 | Henry | 16—93 |

FOREIGN PATENTS

| | | | |
|---|---|---|---|
| 1,119,689 | 12/1961 | Germany | 296—137 |
| 1,182,082 | 11/1964 | Germany | 296—137 |
| 879,929 | 10/1961 | Great Britain | 296—137 |

LEO FRIAGLIA, Primary Examiner

L. J. PAPERNER, Assistant Examiner

U.S. Cl. X.R.

16—93